Nov. 22, 1927. 1,649,799
A. B. BEITMAN
WINDSHIELD
Filed Aug. 11, 1926 2 Sheets-Sheet 2

Inventor
Albert B. Beitman
By Hull, Brock & West
Attorney

Patented Nov. 22, 1927.

1,649,799

UNITED STATES PATENT OFFICE.

ALBERT B. BEITMAN, OF CLEVELAND HEIGHTS, OHIO.

WINDSHIELD.

Application filed August 11, 1926. Serial No. 128,576.

This invention relates to improvements in windshields for motor vehicles and the like, and its primary purpose is the production of a device of this class that will afford the greatest possible range of ventilation and the most advantageous and desirable distribution of the air which enters the vehicle, deflecting it so as to protect the occupants from direct drafts.

To this end I provide a construction wherein the windshield sash is capable of an adjustment toward and from the windshield frame at both top and bottom so that the sash may be spaced from the frame throughout its entire periphery thereby to provide ventilation all the way around the windshield, or the sash may be tilted outwardly at the top only, or at the bottom only, so as to allow the admission of air at either of these places. In all cases the entering air is deflected from a straight inward course by the fact that the edge of the windshield sash overlies, so to speak, to a considerable extent the edge portion of the windshield frame.

Other objects of the invention are to provide a relatively simple and inexpensive construction having the above characteristics and that is easy and convenient of manipulation, and which, when in closed position, will effectively exclude wind, rain, etc.

Figure 1:
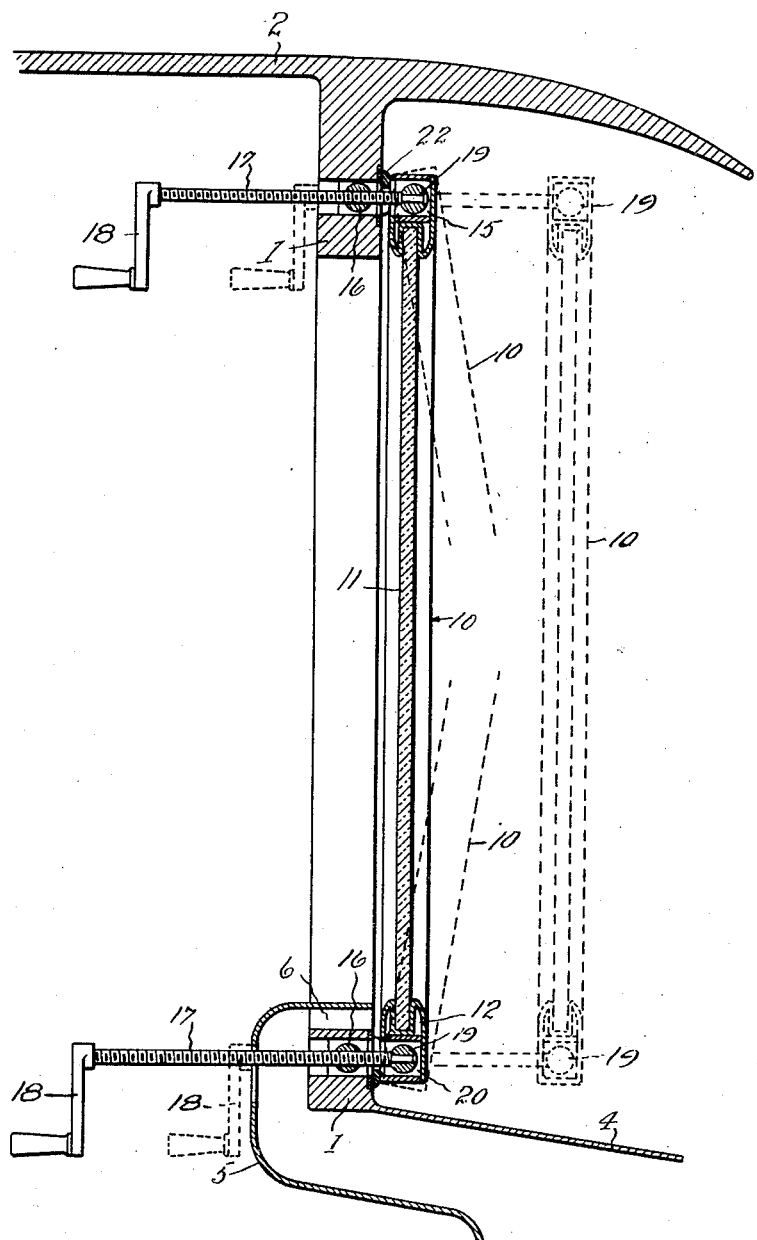
Figure 2:
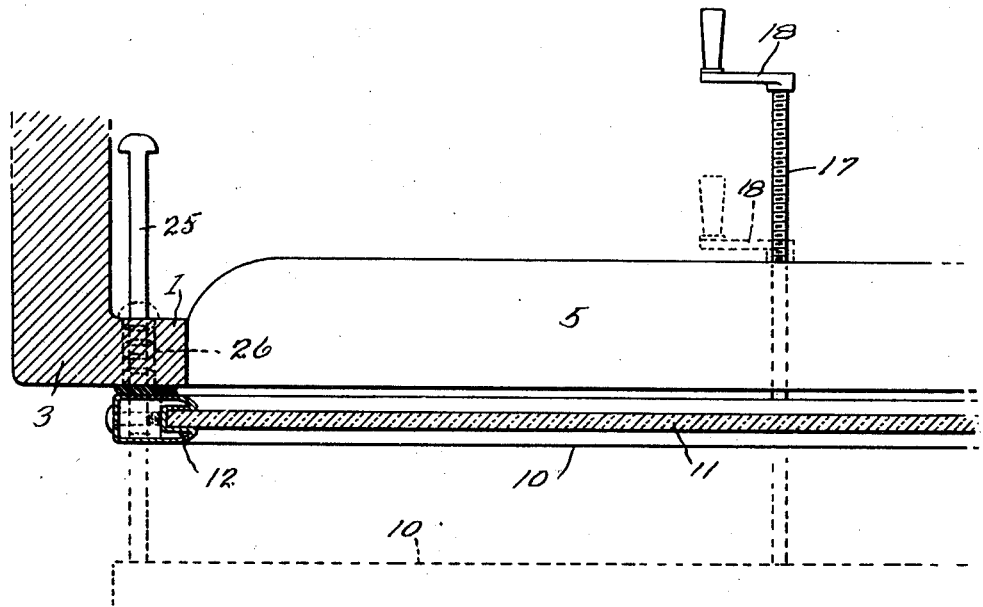
Figures 3, 5:
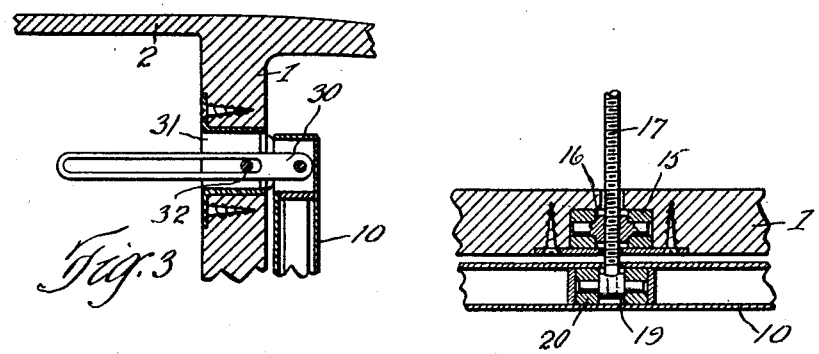
Figure 4:
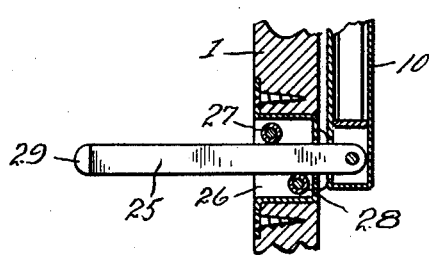

Further objects will appear as I proceed to describe the invention by reference to the accompanying drawing which shows one embodiment of the invention and wherein Fig. 1 is a vertical section from front to rear through the forward portion of an enclosed vehicle body incorporating the invention; Fig. 2 is a fragmentary sectional plan of the same; Figs. 3 and 4 are vertical sectional details through the connections between the ends of the windshield sash and frame; and Fig. 5 is a detail of the connections between one of the adjusting screws and the sash and frame.

The front frame of the vehicle body, which surrounds the windshield opening, is designated 1. This frame joins the top 2 at its upper edge, corner posts—one of which is indicated at 3 in Fig. 2—at its lateral edges, while the cowl 4 extends forwardly from its lower edge. Extending along the lower side of the frame 1, inside the vehicle body, is an air deflector or so-called ventilator 5 whose upper edge projects forwardly over the bottom member of the frame 1 while its lower portion is extended forwardly beneath the cowl 4 thereby to provide an air passage 6 through which a part of the air entering about the lower edge of the windshield sash when the latter is spaced forwardly from the frame 1 is directed beneath the cowl 4 in a well known manner.

The windshield sash is designated generally by the reference numeral 10 and it is comprised of a pane 11 of glass or other transparent material that is bound about its edges by a molding 12, in accordance with common windshield practice. Trunnioned within suitable fittings 15 that are set within the top and bottom members of the frame 1 at about the transverse center of the windshield are blocks 16 (Figs. 1 and 5) through which adjusting screws 17 are threaded. The rear ends of these screws are provided with operating handles or cranks 18 while their forward ends are swiveled in heads 19 that are trunnioned in fittings 20, set within the top and bottom rails of the sash 10. It will be seen that, by turning these screws, the top and bottom edges of the sash 10 may be adjusted toward and from the corresponding members of the frame 1, and it follows from this that the sash may be moved bodily outwardly so that its entire periphery is spaced from said frame thereby to allow air to enter the vehicle body about all sides of the sash. The distribution of the air may be controlled by inclining the windshield so that more air may be admitted at the bottom than at the top, and vice versa, or the sash may be adjusted outwardly at only top or bottom so as to admit air at one of these places and prevent its entrance at the other. When in closed position the sash 10 is drawn firmly back against a cushion 22 of rubber or similar material that surrounds the outer side of the frame 1. The design and pliability of the cushion allows the upper or lower edge of the sash to rock upon it while the opposite edge is adjusted outwardly.

To assist in supporting and guiding the sash 10 in its movements I provide means which will now be described. Pivotally connected to each of the lower corners of the sash 10 is a bar 25 (Figs. 2 and 4) which is guided in a lateral direction between the side walls of a casing 26 that is set into the adjacent side member of the frame 1, and the upper and lower edges of said bar ride on rollers 27 and 28, respectively, that are mounted within the casing 26. By reason of the fact that the upper roller 27 is spaced rearwardly from the vertical plane of the lower roller 28, the bar 25 is permitted to rock upwardly at its outer end but is prevented from dropping below a substantially horizontal position. Thus these bars form a support for the sash 10 and at the same time allow it to swing outwardly and upwardly at its lower edge as is necessary in cases where the sash is opened only at the bottom. The bars 25 terminate at their inner ends in heads 29 which prevent withdrawal of the bars from the casings 26 in a forward direction. Pivotally connected to the upper corners of the sash are slotted links 30 which are guided through casings 31 that are set within the side members of the frame 1. Each casing carries a pin 32 that extends through the slot in the link 30.

While I have herein described the present embodiment of the invention in detail, I wish to be understood as not limiting myself to these structural details further than is required by the terms of the appended claims.

Having thus described my invention, what I claim is:

1. In combination, a windshield frame, a windshield sash, and means movably supporting said sash in operative relation to the frame so that the sash is capable of an independent adjustment toward and from the frame at opposite sides thereof.

2. In combination, a windshield frame, a windshield sash, and means movably supporting said sash in operative relation to the frame so that the sash is capable of independent adjutment toward and from the frame at top and bottom.

3. In combination, a windshield frame, a windshield sash, means movably supporting said sash in operative relation to the frame so that the sash is capable of an adjustment toward and from the frame at opposite edges with said edges substantially parallel with the corresponding members of the frame, and mechanism for so adjusting each edge of the sash independently of the other edge.

4. In combination, a windshield frame, a windshield sash, means movably supporting said sash in operative relation to the frame so that the sash is capable of an adjustment toward and from the frame at opposite edges with said edges substantially parallel with the corresponding members of the frame, and individual means for holding each edge of the sash in various adjusted positions independently of the holding means of the other edge.

5. In combination, a windshield frame, a windshield sash, means movably supporting said sash in operative relation to the frame so that the sash is capable of an adjustment toward and from the frame at opposite edges with said edges substantially parallel with the corresponding members of the frame, and individual mechanism for so adjusting each edge of the sash and for holding it in various adjusted positions independently of the adjusting and holding mechanism of the other edge.

6. In combination, a windshield frame, a cushion of pliable material extending about said frame, a windshield sash of larger area than the opening in said frame and adapted, when in closed position, to rest with its peripheral portion against said cushion, and means movably supporting said sash in operative relation to the frame so that the sash is capable of independent adjustment toward and from the frame at top and bottom.

7. In combination, a windshield frame, members disposed on opposite sides of said frame and movable transversely of the plane thereof, and a windshield sash pivotally connected at opposite sides to said members whereby one of said members may be moved independently of the other member to adjust the adjacent side of the sash.

8. In combination with the windshield frame of an enclosed vehicle body, a windshield sash in operative relation to the frame, and mechanisms located, respectively, adjacent the top and bottom members of the frame for adjusting the sash toward and from the frame.

9. In combination with the windshield frame of an enclosed vehicle body, a ventilator extending over the top and along the rear side of the bottom member of said frame, a windshield sash movably supported in operative relation to and forwardly of the frame, and means for adjusting the sash toward and from the frame throughout its periphery.

10. In combination with the windshield frame of a vehicle body, members supported for oscillation by the top and bottom members of the frame, adjusting screws threaded through said members, a windshield sash, and members supported for oscillation by the sash adjacent the top and bottom edges thereof and within which the ends of said adjusting screws are swiveled whereby the sash may be adjusted toward and from the frame at top or bottom or both.

11. In combination with the windshield frame of a vehicle body, members supported adjacent the lower corners of said frame for movement transversely of the plane of the frame, said members being capable of a lifting movement at their outer ends but incapable of dropping at said ends below a given position, a windshield sash pivotally connected at its lower corners to said members, members supported adjacent the upper corners of the frame and movable transversely of the plane thereof and capable of swinging movement in vertical planes, the outer ends of said members being pivotally connected to the windshield sash adjacent its corresponding corners, members supported for oscillation by the upper and lower members of the windshield frame, adjusting screws threaded through said members, and pivotal connections between the outer ends of said screws and the upper and lower edge portions of the sash.

In testimony whereof, I hereunto affix my signature.

ALBERT B. BEITMAN.